US005154562A

United States Patent [19]

Dornauer

[11] Patent Number: 5,154,562

[45] Date of Patent: Oct. 13, 1992

[54] CARRIAGE FOR TRANSPORTING AN OPERATING TABLE

[75] Inventor: Matthias Dornauer, Karlsruhe, Fed. Rep. of Germany

[73] Assignee: Stierlen-Maquet AG, Rastatt, Fed. Rep. of Germany

[21] Appl. No.: 698,295

[22] Filed: May 10, 1991

[30] Foreign Application Priority Data

May 14, 1990 [DE] Fed. Rep. of Germany ....... 4015469

[51] Int. Cl.[5] .............................................. B62B 3/04

[52] U.S. Cl. .................................................. 414/458

[58] Field of Search ............................... 414/458–461, 414/498, 345; 280/79.3

[56] References Cited

U.S. PATENT DOCUMENTS

| | | | |
|---|---|---|---|
| 1,202,948 | 10/1916 | Wollbrandt | 414/458 |
| 1,239,771 | 9/1917 | Collis | 414/458 |
| 3,378,155 | 4/1968 | Steiner | 414/458 |
| 3,834,568 | 9/1974 | Larson et al. | 414/458 X |
| 4,050,672 | 9/1977 | Lane | 414/458 X |
| 4,508,485 | 4/1985 | Mlinaric et al. | 414/458 |
| 4,521,149 | 6/1985 | Redding et al. | 414/458 X |
| 4,773,806 | 9/1988 | Beaulieu | 414/459 X |

FOREIGN PATENT DOCUMENTS

| | | |
|---|---|---|
| 1158663 | 6/1964 | Fed. Rep. of Germany . |
| 1196815 | 3/1966 | Fed. Rep. of Germany . |
| 8815279 | 3/1989 | Fed. Rep. of Germany . |
| 55422 | 11/1987 | Japan . |

*Primary Examiner*—David A. Bucci

[57] ABSTRACT

A transport carriage for transporting an operating table (20) including a support column (18) and a table plate (26) removable from the support column has a movable chassis (10) and two supporting spars (24) intended to support the table plate. The supporting spars are arranged in spaced parallel relationship to one another on the movable chassis (10) in such a way that they are capable of being brought into a supporting position with the table plate (26) at which they are located on opposite sides of the support column. The transport carriage is further equipped with supporting elements (28,30) for engagement with the support column of the operating table and located on both sides of the intermediate space between the supporting spars (28). These supporting elements are each movable between a supporting position in which it underlies a part fixed to the support column (32) and a free position. Moreover, the two supporting elements (28,30) located on opposite sides of the intermediate space are so connected to one another that upon adjustment of one of them the other is adjusted to the same position.

3 Claims, 3 Drawing Sheets

CARRIAGE FOR TRANSPORTING AN OPERATING TABLE

BACKGROUND OF THE INVENTION

The invention concerns a transport carriage for transporting an operating table including a support column and a table plate removable from the support column. The transport carriage has a movable chassis and two supporting spars intended to support the table plate, which supporting spars are so arranged on the movable chassis and spaced in parallel arrangement to one another that they can be brought into an engaging position with the table plate at which they are located on opposite sides of the support column.

Transport carriages of this kind are for example described in German patents 1 158 636 and 1 196 815. In the case of the systems there described for transporting the table plate of an operating table the transport carriages are so movable toward the operating table that the support column is located between the two supporting spars with the supporting spars underlying the table plate. Then the support column of the operating table is lowered. When the table plate comes to rest on the supporting spars of the transport carriage, it can no longer follow the lowering movement of the support column, so that the support column is removed from the table plate. Then the table plate which is now on the transport carriage can be moved away. The transfer of the table plate from the transport carriage to the support column takes place in the reverse way.

It is further known from Japanese patent 62-55422 to transport an entire operating table, in which case the supporting spars can rigidly underlie a part connected with the support column. In this case if the raising and lowering mechanism of the operating table, located inside the support column, is operated in the sense to lower the table plate, after the engagement of the part rigidly connected with the support column onto the supporting spars of the transport carriage the support column cannot be further lowered. Instead of this the support column foot is raised. After this occurs the operating table in its entirety can be transported. This system is nevertheless usable in the case of a transport carriage intended to underlie the table plate and not the support column, so far as non-special latching means are provided which guarantee a coupling between the table plate and the support column, when the operating table lies only with its table plate on the transport carriage.

The invention has as its object the provision of a transport carriage of the aforementioned type having simple to operate means making possible on one hand use of the transport carriage only to lift and transport the table plate and on the other hand also to transport the entire operating table.

SUMMARY OF THE INVENTION

The invention resides in the transport carriage on both sides of the space receiving the support column having at least one supporting element for engaging the support column of the operating table and so arranged that it is movable between a supporting position in which it extends into the space between the spars to underlie a part fixed to the support column and a free position, and in that the two supporting elements located on both sides of the intermediate space are so connected with one another that upon the adjustment of one of them the other is adjusted to the same position.

If the supporting elements are in their free positions the table plate can be lifted in the above-described way from the support column and can be transported without the support column. On the other hand if the supporting elements are adjusted to their supporting positions in which they underlie a part fixed to the support column the entire operating table can be transported on the transport carriage without special latching means between the table plate and the support column of the operating table being provided, which would have to be made so strong that they could carry the weight of the support column. Moreover, the above-described functional connection of the two supporting elements guarantees that only one of the elements has to be adjusted while the other coupled supporting element located on the opposite side of the transport carriage and on the other side of the operating table is thereby automatically correspondingly adjusted. This simplifies the operation especially in the case where only a single human operator is at hand.

The two supporting elements can be coupled with one another in a simple and economical way in that they are connected by a Bowden tube mechanism whose core wire at its ends is connected with one supporting element and at its other end with the transport carriage and whose sheath at one end is connected with the transport carriage and at its other end to the other supporting element. If the supporting element connected with the movable end of the core wire is adjusted the wire swells out since its other end is fixed. This therefore leads to the sheath having to follow the swelling. Since one of its ends is fixed, the sheath with its movable end adjusts the supporting element connected to it in the adjusting direction opposite to that of the first supporting element. Therefore in a simple way an oppositely directed adjustment of the two supporting elements is obtained. Preferably the Bowden tube mechanism runs through a cross-spar connecting the two supporting spars so that it is neither visible nor can be disturbed and is also protected against damage.

In accordance with a preferred embodiment the supporting elements are each made in the form of a pivoting lever supported on the end of a post supporting one of the supporting spars whereby the core wire and the sheath of the Bowden tube mechanism are at their movable ends fixed to the associated pivoting levers at points spaced from the pivot axis of the pivoting levers. This solution can be implemented in a simple way and offers moreover the possibility of a stable support and a reliable adjustability.

Further advantages and features of the invention will be apparent from the following description which in connection with the accompanying drawings explain the invention in connection with an exemplary embodiment. The drawings are:

DETAILED DESCRIPTION OF THE PREFERRED EMBODIMENT

Figure 1:
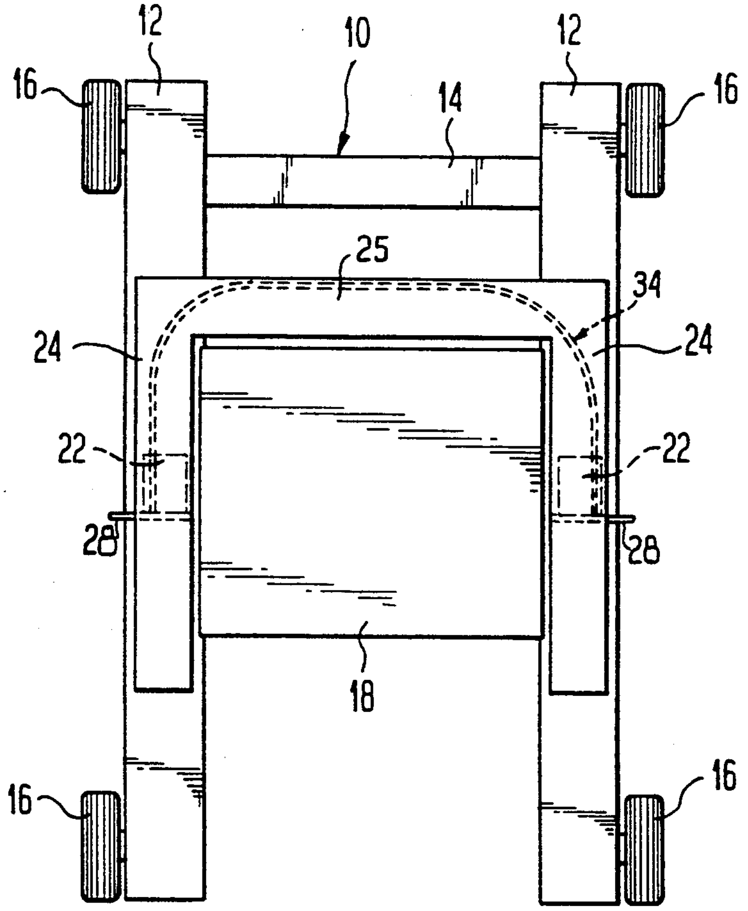
FIG. 1—A schematic plan view of a transport carriage and a support column of an operating table.
Figure 2:
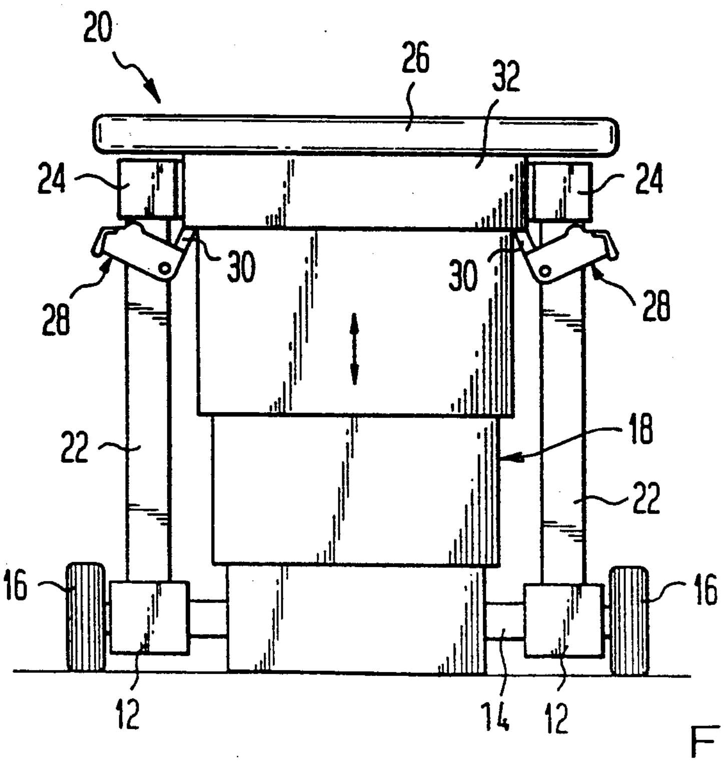
FIG. 2—A schematic side view of the transport carriage illustrated in FIG. 1 and an entire operating table after the insertion of the transport carriage under the table plate.

The transport carriage illustrated in FIGS. 1 and 2 includes a chassis, indicated generally at 10, with longitudinal spars 12 connected to one another by at least one transverse spar 14 in the area of one of their longitudinal ends, and on which wheels 16 are supported. It is seen in FIG. 1 that the chassis is open at one of its ends so that the transport carriage is movable in such a way to a support column 18 of an operating table 20 (FIG. 2) that the two longitudinal spars 12 are located on opposite sides of the support column 18.

Associated with each of the longitudinal spars 12 is a horizontal supporting spar (4 running generally parallel to the associated longitudinal spar 12 and connected to it by means of a vertical post 22. The supporting spars are further connected to one another by a horizontal cross-spar 25 as seen in FIG. 1. The construction is so chosen that in the position of the transport carriage relative to the support column 18 of the operating table 20, as illustrated in FIG. 1, the supporting spars 24 underlie the table plate 26 of the operating table. In connection with this it is however to be stressed that the supporting spars do not actually have to be insertable under the table plate as shown, but that only the possibility has to exist that the supporting spars can somehow come into supporting mesh with holding elements fixed to the table plate.

Figure 3:
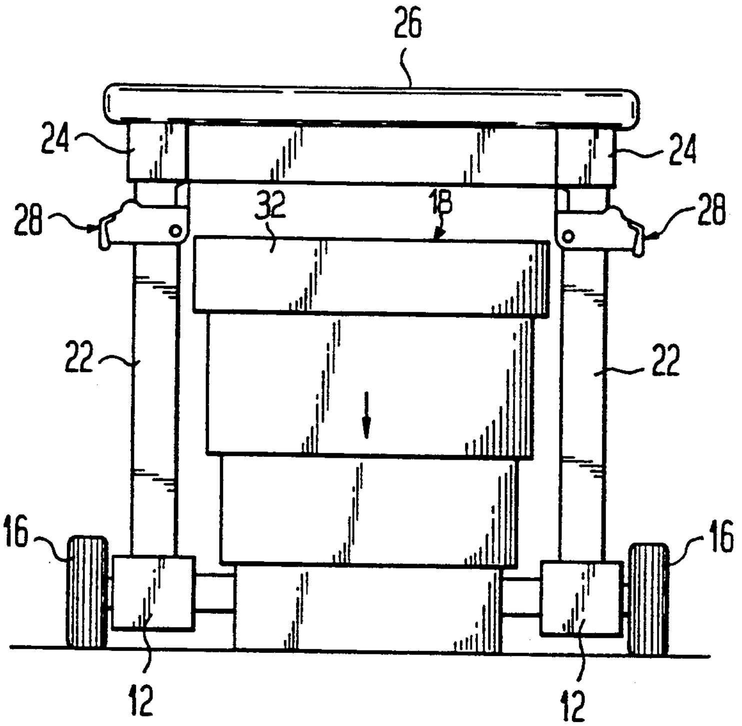
FIG. 3—A figure corresponding to FIG. 2 with the table plate lifted from the support column.
Figure 4:
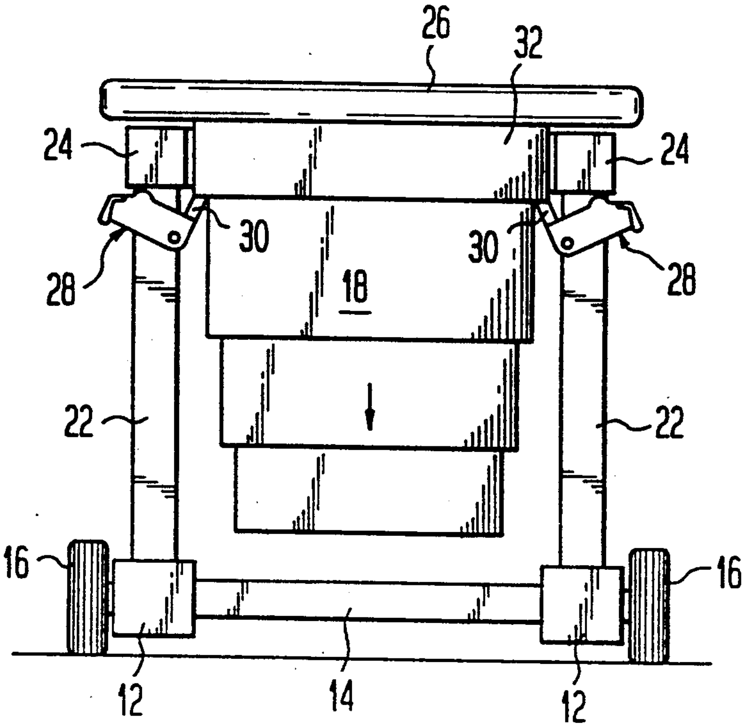
FIG. 4—A figure corresponding to FIG. 2 with the entire operating table in its transport position.

A pivoting lever 28 is so pivotally supported on each of the posts 22 near the associated supporting spar 24 that it is movable between a free position shown in FIG. 3 and a supporting position shown in FIGS. 2 and 4, in which supporting position it extends into the intermediate space between the supporting spars 24 and can underlie the head 32 of the support column 18.

If the support column 18 is lowered from the position shown in FIG. 2 by means of an internal raising and lowering mechanism the table plate will be transferred to the transport carriage. The support column 18 then releases itself from the table plate, and the transport carriage thereupon be moved away with the table plate.

If one however wants to transport the entire operating table including the support column 18, the pivoting levers 28 are swung to their positions shown at FIG. 4 at which they underlie the column head 22. If now proceeding from the position illustrated in FIG. 2 the raising and lowering mechanism of the support column 18 is operated in a mode corresponding to lowering of the support column, instead of the support column and the table plate being lowered the foot of the column is lifted, since the column head rests on the supporting elements 30 facing radially upwardly. Now the entire operating table can be moved.

Figure 5:
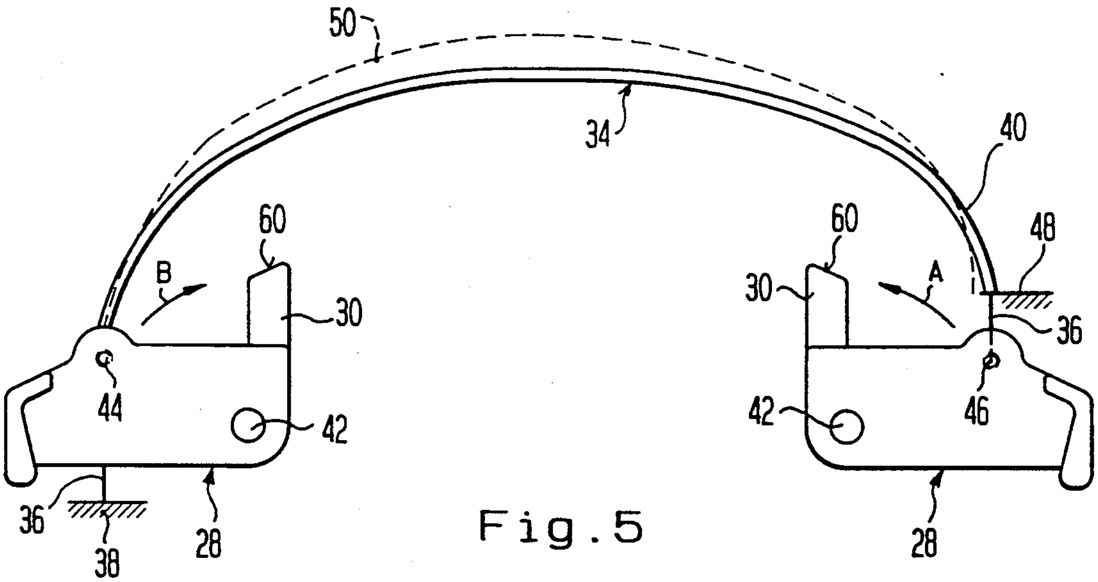
FIG. 5—A schematic illustration of the two support element forming pivotal levers with their associated Bowden tube connection.

FIG. 5 shows how the two supporting elements 30 can be adjusted in an easy way with the pivoting levers 28, so that it is sufficient to actuate only one of the pivoting levers 28. The other pivoting lever as a result of this undergoes movement in the opposite direction. In accordance with FIG. 5 the two pivoting levers are connected by a Bowden tube mechanism indicated generally at 34 and preferably conducted through the cross-spar 25 as seen in FIG. 1. As seen in FIG. 5 at the left pivoting lever 28 the core wire 36 of the Bowden mechanism is fixed to an element 38 fixed to the transport carriage The associated end of the sheath or tube 40 of the mechanism 34 is connected with the pivoting lever 28 at a point 44 spaced from the lever's pivot axis 42. At the right pivoting lever as seen in FIG. 5 the core wire 36 of the Bowden mechanism 34 is connected with the lever 28 at a point 46 spaced from the lever's pivot axis 42, while the associated end of the sheath or tube 40 is fastened to the transport carriage at the point 48.

If the right pivoting lever of FIG. 5 is adjusted in the direction of the arrow A in the counterclockwise sense the core wire 36 swells itself to the position shown by the broken line 50 since its left end cannot move. Since the sheath 40 must follow the movement of the core wire 36, and moreover at its right end is likewise fixed to the transport carriage, the left pivoting lever is accordingly compelled to be adjusted in the clockwise sense in the direction of arrow B. In the same way an adjustment of the two pivoting levers can be achieved by manually moving only the left lever. This coupling together of the two pivoting levers simplifies considerably the operation of the transport carriage by a single human operator, since the operator does not have to walk around the operating table to actuate the pivoting levers on both of its sides.

Figure 6:
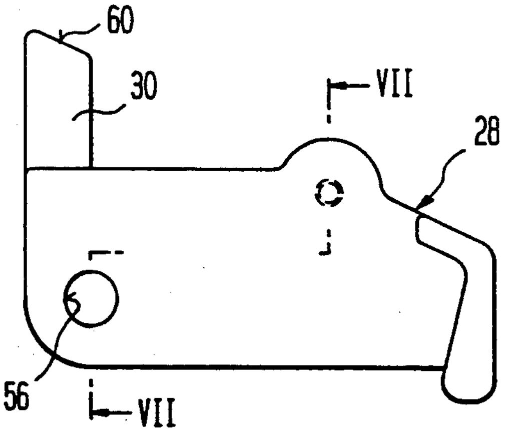
FIG. 6—A side view of a pivoting lever alone.
Figure 7:
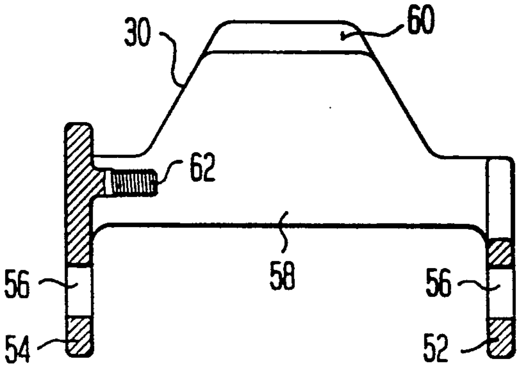
FIG. 7—A plan view of the pivoting lever of FIG. 6.

As can be seen in FIGS. 6 and 7 each pivoting lever is formed as a forked part with two legs 52 and 54 in which are supporting bores 56 for receiving the pivot shaft 52. The two legs 52, 54 are connected with one another by a middle cross piece 58 which upon pivoting of the lever 28 to its supporting position engages the associated post 22 and thereby simultaneously limits the pivoting movement of the lever and fixes the supporting position of the lever. In this supporting position an inclined surface 60 on the free end of the supporting element 30 is arranged horizontally to provide a solid support for the support column. An additional portion 62 is formed on the leg 54 of the lever and extends inwardly, and onto this portion the core wire or the sheath of the Bowden mechanism 34 can be fixed. The other pivoting lever is mirror image symmetrical to the one here described.

I claim:

1. A transport carriage for transporting an operating table (20) including a support column (18) and a table plate (26) removable from the support column; said transport carriage having a movable chassis (20) and two supporting spars (24) for supporting the table plate (26) which supporting spars are so arranged in spaced relationship and parallel to one another on the movable chassis (10) that they are movable to an engagement position with the table plate (26) at which they are located on opposite sides of the support column (18), characterized in that on the transport carriage on each side of the intermediate space between the supporting spars (24) is at least one supporting element (28, 30) for engagement with the support column (18) of the operating table and which is so arranged that is movable between a supporting position in which it extends into the intermediate space between the supporting spars to underlie a part (32) fixed to the support column and a free position, and that two of said supporting elements (28, 30) located on opposite sides of the intermediate space are so connected with one another by a Bowden tube mechanism (34) that upon adjustment of one of the supporting elements (28, 30) the other supporting element (28, 30) is adjusted to the same position, said Bowden tube mechanism (34) having a core wire (36) and a sheath (40), said core wire (36) at one of its end being connected with one of the support elements (28, 30) and at its other end being connected with the transport carriage, and said sheath (40) at one of its ends being connected with the transport carriage and at its other end being connected with the other supporting element (28, 30).

2. A transport carriage according to claim 1 further characterized in that the Bowden tube mechanism (34) is conducted through a cross-spar (25) connecting together the supporting spars (24).

3. A transport carriage according to claim 1 further characterized in that the supporting elements are each provided in the form of a pivoting lever (28) which is pivotally supported by a post (22) supporting one of the supporting spars (24) with the core wire (36) and the sheath (40) of the Bowden tube mechanism having their associated movable ends connected to the associated pivoting levers (28) at points spaced from the pivot axes (42) of the levers.

* * * * *